United States Patent
Smith

(10) Patent No.: US 7,841,009 B1
(45) Date of Patent: Nov. 23, 2010

(54) SYSTEM AND METHOD FOR DEFENDING AGAINST REVERSE ENGINEERING OF SOFTWARE, FIRMWARE AND HARDWARE

(75) Inventor: Fred Smith, Belmont, MA (US)

(73) Assignee: Angel Secure Networks, Ornono, ME (US)

( * ) Notice: Subject to any disclaimer, the term of this patent is extended or adjusted under 35 U.S.C. 154(b) by 844 days.

(21) Appl. No.: 11/178,527

(22) Filed: Jul. 11, 2005

Related U.S. Application Data

(60) Provisional application No. 60/586,573, filed on Jul. 9, 2004.

(51) Int. Cl.
G06F 19/00 (2006.01)
G08B 23/00 (2006.01)

(52) U.S. Cl. .......................... 726/26; 726/22
(58) Field of Classification Search ............... 72/24, 72/23; 726/24, 23, 22, 25, 26, 17; 713/150, 713/190, 194
See application file for complete search history.

(56) References Cited

U.S. PATENT DOCUMENTS

| | | | | |
|---|---|---|---|---|
| 6,067,582 A * | 5/2000 | Smith et al. ................. | 710/5 |
| 6,532,543 B1 | 3/2003 | Smith et al. | |
| 6,668,325 B1 * | 12/2003 | Collberg et al. ............ | 713/194 |
| 6,842,862 B2 * | 1/2005 | Chow et al. ................. | 713/190 |
| 6,918,038 B1 | 7/2005 | Smith et al. | |
| 7,117,535 B1 * | 10/2006 | Wecker ....................... | 726/29 |
| 7,124,445 B2 * | 10/2006 | Cronce et al. .............. | 726/26 |
| 7,149,308 B1 * | 12/2006 | Fruehauf et al. ............ | 380/44 |
| 7,170,999 B1 * | 1/2007 | Kessler et al. ............... | 380/277 |
| 7,233,948 B1 * | 6/2007 | Shamoon et al. ............ | 707/9 |
| 7,370,360 B2 * | 5/2008 | van der Made ............. | 726/24 |
| 2003/0126457 A1 * | 7/2003 | Kohiyama et al. ......... | 713/193 |
| 2003/0188187 A1 * | 10/2003 | Uchida ....................... | 713/200 |
| 2003/0212902 A1 * | 11/2003 | van der Made ............ | 713/200 |
| 2003/0221121 A1 * | 11/2003 | Chow et al. ................. | 713/200 |
| 2003/0236986 A1 * | 12/2003 | Cronce et al. ............... | 713/189 |
| 2004/0111613 A1 * | 6/2004 | Shen-Orr et al. ........... | 713/165 |
| 2005/0097441 A1 * | 5/2005 | Herbach et al. ............ | 715/501.1 |
| 2006/0005250 A1 * | 1/2006 | Chu et al. .................... | 726/26 |
| 2006/0005252 A1 * | 1/2006 | Chu et al. .................... | 726/26 |
| 2007/0234070 A1 * | 10/2007 | Horning et al. ............. | 713/190 |

OTHER PUBLICATIONS

US 5,748,741, 05/1998, Johnson et al. (withdrawn)*

* cited by examiner

*Primary Examiner*—Eleni A Shiferaw
(74) *Attorney, Agent, or Firm*—Pierce Atwood LLP; Ralph Trementozzi

(57) ABSTRACT

A method for defending a software against reverse engineering in a target environment includes acquiring information from the target environment, encrypting the software to be protected with the acquired information, sending the encrypted software with the acquired information to an execution environment, acquiring information from the execution environment, comparing the information from the execution environment with the acquired information from the target environment to authenticate the execution environment as the target environment, and if the two set of information match, decrypting the software to be protected, and if two set of information do not match, destroying said software.

17 Claims, 8 Drawing Sheets

OVERVIEW OF COMPILING AN OEXE

LAYERED PROTECTION FOR DARE SYSTEM

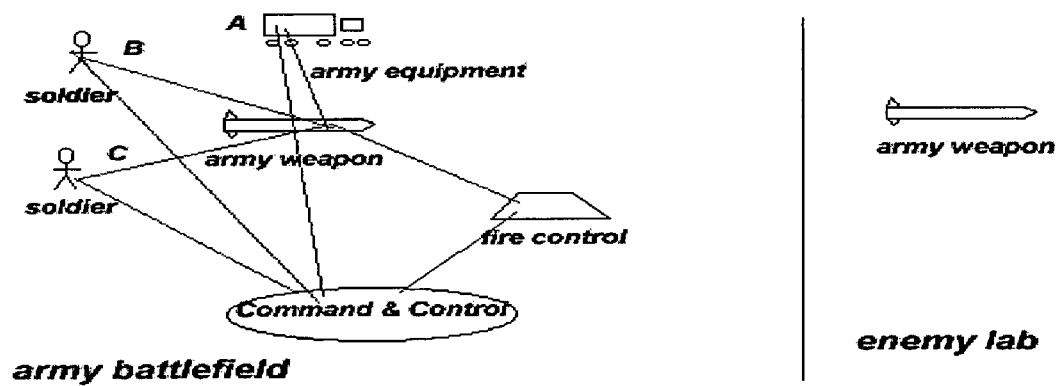
Figure 2: Reference Diagram for Protected Execution Environment for Army Weapon System

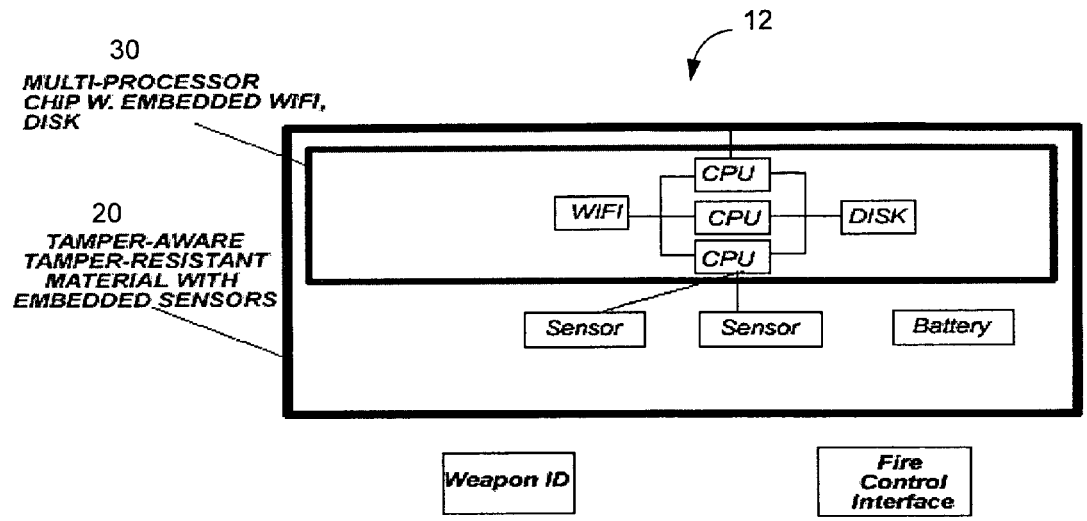
Figure 3 provides another reference diagram for a protected execution environment for an army missile system.
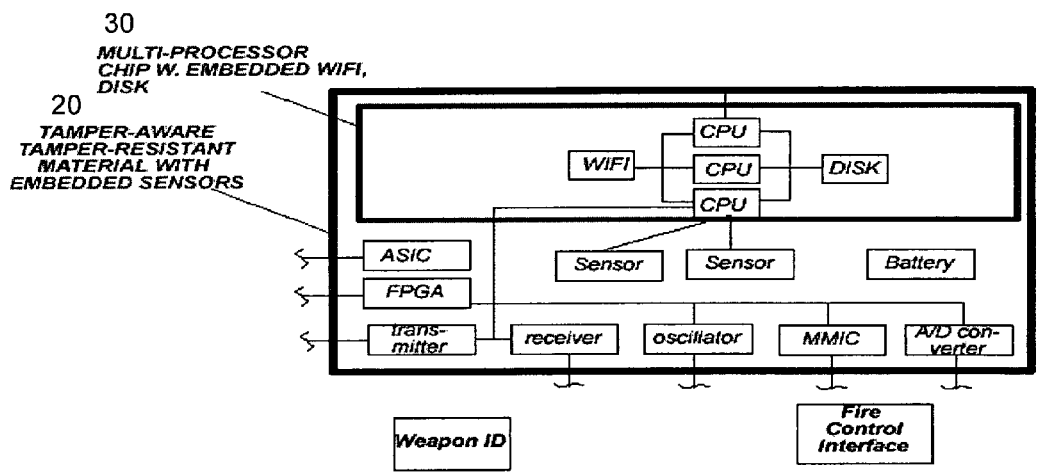
Figure 4: Reference Diagram for System to Protect Software and Firmware

OEXE STATE DIAGRAM

OVERVIEW OF COMPILING AN OEXE

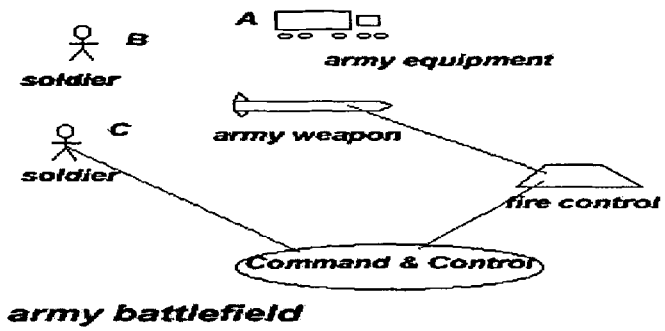
Figure8: Acquiring Information About the Target Site By Wireless
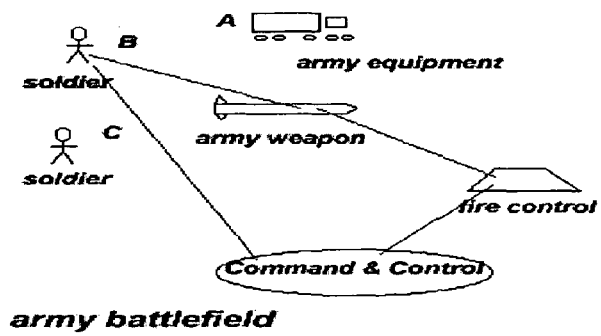
Figure 9: Delivery of an "angel" agent to the Target Site with Confirming Orthogonal Material

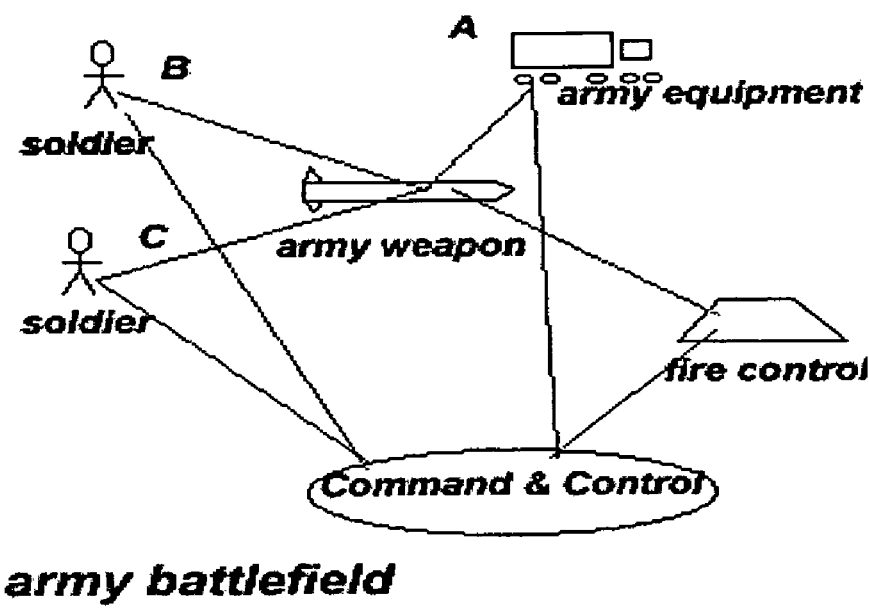
Figure 10: Installation of OEXE on Target Site

# SYSTEM AND METHOD FOR DEFENDING AGAINST REVERSE ENGINEERING OF SOFTWARE, FIRMWARE AND HARDWARE

CROSS-REFERENCE TO RELATED APPLICATION

The present application claims priority to provisional U.S. patent application Ser. No. 60/586,573, filed Jul. 9, 2004, the disclosures of which are incorporated herein by reference.

The invention was partially made with Government support under Contracts No. F33615-03-M-1506 and No. FA8650-05-M-8025, both of which were issued by the Air Force Research Laboratory at Wright Patterson Air Force Base. The Government has certain rights in the invention.

FIELD OF THE INVENTION

The present invention relates to systems and methods of defending against reverse engineering of software, firmware, and hardware, and more particularly, to systems and methods of defending against reverse engineering in a target environment.

BACKGROUND OF THE INVENTION

Reverse engineering (RE) is the process of taking something (a device, an electrical component, a software program, etc.) apart and analyzing its workings in detail, usually with the intention to construct a new device or program that does the same thing. Reverse engineering is often used by military, in order to copy the opponent's technology or classified information. Other purposes of reverse engineering include security auditing, removal of copy protection, circumvention of access restrictions often present in consumer electronics and customization of embedded systems, for example engine management systems.

In reverse engineering, a hacker typically obtains a copy of the software (or firmware, hardware) and runs and debugs the software in an environment which the hacker controls. Techniques are available to automate the debugging process, and these techniques are being improved and will become more automatic. The software may be made more and more complex by scrambling the source code or scrambling the compiled binaries. However, if the software runs in an execution environment controlled by the hacker, the hacker may be able to extract the functionality no matter how scrambled the binaries or source code. The software may also be compressed and encoded (encrypted). Of course, this software has to be decompressed and decrypted before it can be actually executed. At some point, the software has to be presented to the executing environment in a decompressed and decoded state in order to execute, and at this point, the software is vulnerable to capture by the hacker. Also, hackers may be able to break encryption and compression schemes. Software may also contain various code snippets to detect the presence of a debugger or a tracer, and when it detects the debugger or tracer, to take various defensive actions. These conventional security techniques including using anti-debugging code is also routinely defeated by the hacking community. Brute force methods may be used in reverse engineering of firmware and hardware.

There is need for new effective methods and systems for protecting software, firmware, and hardware from being obtained by a hostile party and/or being reverse-engineered.

SUMMARY OF THE INVENTION

The present invention provides methods and systems for allowing protected software binaries, libraries, scripts, and supporting data files to run on a target environment while prohibiting an adversary from viewing or making a copy of these files. The present invention also provides methods and systems for producing software that protects other software, and which is itself very difficult to be reverse engineered. The present invention also provides method for safely installing software on a target environment.

Glossary

Protected Software. The software to be protected is an executable together with the libraries, script files, and data files needed by the executable.

Target Environment. The target environment is the computer environment on which the protected software will execute.

Obfuscated Executable (OEXE). The protected software is encrypted. The encrypted software is inserted into another executable, the OEXE.

Operation of the OEXE. The OEXE runs on the target environment. The OEXE runs various tests to determine that the target environment is safe. If the OEXE determines that the target environment is safe, the OEXE decrypts the protected software and runs it on the target environment. While the protected software is running on the target environment, the OEXE continuously monitors for signs that the target environment has become unsafe. If the OEXE determines that the target environment has become unsafe, the OEXE destroys any protected software that is decrypted, either in memory or on the disk. The OEXE is potentially subject to capture by an adversary. The OEXE itself is fortified against reverse engineering.

Orthogonal Authentication. The target environment is supplied with cryptographic and other values which the enemy cannot duplicate. Orthogonal authentication means supplying values taken or derived from or produced by systems that are unrelated (orthogonal) to the system which is to be protected. Orthogonal Authentication is used throughout this invention.

Just in Time Values and Installation. Values are supplied just in time, which means as close to the time the values is used as is possible under the circumstances, so that the life time of these values is as minimal as possible.

Minimal Exposure. The protected software is exposed in a decoded state for the minimal time required for the software to perform its function.

Protect Execution Environment. The execution environment is protected, so that the enemy cannot control this environment, and so the enemy cannot steal software from this environment.

Control Repeatability. Repeatability is controlled. If the software needs to run only once, it runs only once and denies the enemy of the possibility of testing the software by repeatedly executing it.

ANGEL. Anonymous Networked Global Electronic Link. An agent that communicates with a remote sever using encrypted packages for which the keys that are periodically strobed. The Anonymous part of the acronym refers to the fact that the location of the server is known only to the ANGEL. The standard ANGEL (Type 1, Single Processor) is an agent which can be installed only once in a predefined location and can be run only once from a predefined target. The parallel ANGEL (Type 2, Multiple Processors) is an ANGEL which is located in a share directory on a cluster, and is executed from the share directory by the various nodes in the cluster.

aproc. A software module which essentially examines the /proc file system on a LINUX system to detect the presence of an attack by an adversary.

blocking sockets. These are socket calls that block (wait) until they receive data. The will hang the application unless they utilized in separate processes or threads.

BEOWULF. A group of computers that work together to perform parallel processing where the software is open source and where the computers are off the shelf inexpensive processors. Refers to the fact that the literary Beowulf could perform many deeds.

CEXE. Clear Executable, the software to be protected before it has been obfuscated by the ROC 1 or ROC 2 compiler.

child process. A process created from a parent process which is destroyed when the parent process terminates. A child process is created by the fork( ) function in LINUX.

DES. Triple DES is the currently approved encryption standard for symmetric encryption. Symmetric encryption is encryption where the same key is used for encryption and decryption.

ELF executable. Format for a an executable commonly used in LINUX. An OEXE is an ELF executable into which various protected software is encrypted and inserted.

Farm. This is an open source agent program, maintained by the University of Massachusetts, and used at UMAINE. Farm is written in Java, and uses Perl control mechanisms. More detail about Farm can be found in Bibliography.

MPI. Message Passing Interface. A communications standard used in cluster computing. MPI is used for the mppom program.

mppom. Massively Parallel Princeton Ocean Model. A large program utilized by UMaine which simulates ocean currents. mppom is currently implemented on large Beowulf clusters. The main executable is 8 megs in size. mppom will run for a day to simulate a month of currents. mppom is written in Fortran. More detail about mppom is located in reference in the Bibliography.

orthogonal id. A procedure to verify the identity of the target site. The orthogonal procedure guarantees, using procedures that are orthogonal (unrelated) to the system under test, that the target site is authentic rather than spoofed.

ps. The ps command in Linux. The ps command only looks at the /proc file system at one point in time, whereas the aproc module is developed to look at the /proc file system at successive intervals and is able to compare one point in time with another point in time.

/proc. A file system in LINUX which contains an entry for every running process, together with certain information about the process.

ramfs. Virtual memory, where the OEXE is stored until it runs the CEXE, which then runs in ramfs.

rcp. A copy program in UNIX which uses SSH.

recv a socket command to receive data.

ROC 1. Random Obfuscating Compiler protects software running on a single processor at a remote site.

ROC2. Random Obfuscating Compiler which protects software running in a clustered environment.

RSA. The RSA algorithm is the widely used algorithm by asymmetric encryption, where a public key is used perform encryption in one direction and a private key is used to perform encryption in the other direction.

rsh. An early version of ssh which is not considered secure. rsh is used on our test Beowulf cluster.

semaphore. A semaphore is facility provided by the operating system to limit access to memory so that only 1 thread or 1 process at a time can write to the memory. A semaphore is one method of managing applications with multiple processes or multiple threads where the same memory is simultaneously accessed by multiple threads or processes.

share directory. A directory that is shared across multiple processes. Commonly used in cluster computing.

ssh. A remote login facility in LINUX which permits encrypted data transfer after a password login.

automated ssh. Automating ssh and secure copy (scp) using rsa keys with commands ssh-keygen, ssh-agent and ssh-add. This technology permits secure copying between LIINUX machines and the ability to securely run processes on remote machines under batch control.

select. A method of utilizing sockets without blocking. ROC 2 uses blocking sockets and does not use select.

threads. A unit of execution which can be running in parallel with processes and threads. ROC 2 does not use threads but rather achieves similar results through the use of multiple processes.

TCP/IP. A standard for message passing over an interne whereby delivery is guaranteed. TCP/IP uses sockets.

According to one preferred embodiment, a method for defending a software against reverse engineering in a target environment includes acquiring information from the target environment, encrypting the software to be protected with the acquired information, sending the encrypted software with the acquired information to the target environment, checking, on the target environment, if the acquired information matches current information of the target environment, and if the acquired information matches the current information of the target environment, decrypting the software to be protected, and if the acquired information does not match the current information of the target environment, destroying said software. The best approach for this embodiment is to use the acquired information to form a decryption key rather than storing the decryption key inside the obfuscated executable.

In one preferred form, the method includes generating an obfuscated executable (OEXE) program to incorporate the software to be protected with the acquired information using a random obfuscating compiler (ROC).

The present invention further provides a random obfuscating compiler (ROC) system for defending a software against reverse engineering in a target environment. The ROC system employs one or more ANGELS, a compiler, and an Obfuscated Executable to achieve the required functionality to protect the clear executable (CEXE) (including the software to be protected) and its subsidiary files from capture by an adversary and subsequent reverse engineering.

An ANGEL is an agent which runs on a target site before installation of the OEXE. The ANGEL acquires information about the target site, namely the state of the system clock, stat values from various files, and a list of the processes that are running on the target site.

The present disclosure provides two embodiments of the ROC system, ROC 1 and ROC2. In ROC1, the ANGEL visits the protected site (i.e., target site), acquires information from the protected site and generates a file or a package including the acquired information. The package produced by ANGEL is used to encrypt the protected software inside an OEXE. The OEXE runs only on the protected site. If the protected site appears safe, OEXE decrypts the protected software and runs it in ramfs, accessible only by root. When software has finished running, OEXE deletes the protected software from ramfs. The encryption keys are formed by values available from the target environment and are not are hidden in the OEXE. This technique does not work in a cluster environment.

In ROC2, the ANGEL and the OEXE securely communicate with a server using TCP/IP. In this embodiment, the key to begin decrypting the CEXE is generated on the server and retained on the server until the OEXE has provided information about the target site and after the server has analyzed this information and determined that the target site is authentic and does not contain harmful worms. The server securely passes the key to the OEXE running on the target site, the OEXE decrypts and runs the CEXE. In this embodiment, the OEXE would monitor the CEXE while it runs and remain in contact with the server. The ROC2 environment would also support one or more ANGELs running on the target site or sites which would also monitor the CEXE while it executes.

BRIEF DESCRIPTION OF THE DRAWINGS

These and other features and advantages of the present invention will be better understood by reference to the following detailed description when considered in conjunction with the accompanying drawings wherein:

FIG. 2 shows a diagram of a protected environment according to one preferred embodiment of the present invention;

FIG. 3 schematically shows a system for protecting a target environment according to one preferred embodiment of the present invention;

FIG. 4 schematically shows a system for protecting a target environment according to another preferred embodiment of the present invention;

FIG. 8 schematically shows an application of the present invention according to one preferred embodiment of the present invention;

FIG. 9 schematically shows an application of the present invention according to another preferred embodiment of the present invention;

FIG. 10 schematically shows an application of the present invention according to a further preferred embodiment of the present invention;

DETAILED DESCRIPTION OF THE PREFERRED EMBODIMENTS

The present invention is directed to systems and methods against reverse engineering of software, firmware, and hardware, which are possessed by a hostile party, or which runs in an environment which the hostile party controls. The device intended to be protected including software, firmware, hardware etc. hereinafter is referred to as software. A person skilled should understand that the present invention can be applied to other devices or systems other than software.

Figure 1:
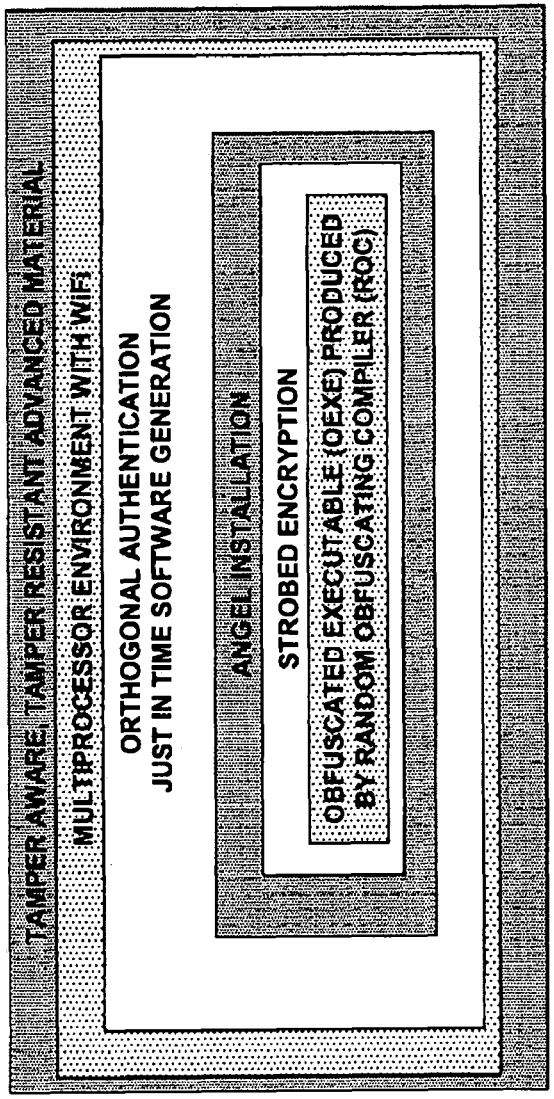
FIG. 1 is a schematic view of a preferred embodiment of a system for defense against reverse engineering according to one preferred embodiment of the present invention.

A system 10 embodying the present invention that provides layered protection against reverse engineering attacks is illustrated in FIG. 1. As shown in FIG. 1, the system 10 includes multi-layer of protections, which include, from the outermost to the innermost, a tamper aware or tamper resistant advanced material, a multiprocessor environment with WiFi, an orthogonal authentication, a just-in-time software generation, an "angle" installation, a strobe encryption, and an obfuscated executable (OEXE) produced by random obfuscating compiler (ROC). Each layer of protection will be described in detail below.

Protected Environment

The system against reverse-engineering provides an environment which is suitable for protecting software from reverse engineering. The required environment has many possibilities for providing orthogonal inputs (that is inputs that an adversary cannot supply) and provides for physical security for the protected software.

FIG. 2 is a reference diagram for such an environment for an army missile. On the left side of FIG. 2, an army weapon and a missile on the battlefield, which is in communication with a Command and Control Center through its fire control, are shown. Nearby are soldiers and some pieces of army equipment, and these are also in communication with the weapon and with the army Command and Control. Under these circumstances, the Command & Control Center supplies software to the weapon through the fire control and supplies cryptographic values to the weapon through the fire control and orthogonally through the soldiers and the equipment. This is to be contrasted with the same weapon, having been captured or stolen, in an enemy laboratory, where these same values cannot be supplied.

Using the multiple paths to the weapon from the Command and Control Center, users can supply unique orthogonal values to the weapon and use these values to decrypt protected software in the weapon and to control the execution of the OEXE in the weapon. The hostile party is unable to supply these values and, if the system is implemented, cannot exercise the OEXE in the hostile party's laboratory.

The system embodying the present invention can be used to a government controlled research laboratory. The modalities of supplying orthogonal values would be different, but the principle is the same. In a government research laboratory, the values supplied in real time on the battlefield can be supplied by hand carried disks, in circumstances where the target computer environment is not connected to a network.

FIG. 3 shows a package 12 consisting of tamper-aware and/or tamper-resistant material 20 with embedded sensors that surrounds a chip with multiple processors, for example, the Intel Series 2400 Pentium 4. The tamper-aware and/or tamper-resistant material 20 can be attached to a processor. When an adversary attempts to remove or cut through the tamper-aware and/or tamper-resistant material 20, the embedded sensors in the material 20 detect the intrusion and generate an alarm, and the processor detects the alarm. Also, there may be additional sensors attached to the processor and surrounded by the tamper-aware and/or tamper-resistant material 20, which detect other alarm conditions, such as shock. The system also can be configured to generate an alarm upon detection of unplugging of the package 12 from the weapon. Upon receipt of an alarm, the CPU destroys all exposed copies of protected software and then the OEXE itself, both in memory in the CPU's and on the disk. The package 12 preferably has an internal battery sufficient to power destruction of the software upon receipt of an alarm.

The CPU's in the chip is configured to detect an ID for the weapon, for example, by a hard wired path, and communicates with the fire control and with other actors such as soldiers and nearby equipment (see FIG. 2) via a wireless interface. Communication with these various actors provides orthogonal values as previously discussed.

Multiple processors also provide orthogonality. In one form of the invention, one processor runs the OEXE and eventually, if the environment is safe, the protected software. Another processor detects timing values from the first processor, and uses these values to detect the presence of a debugger. The first processor can also use timing values from the second processor to detect the presence of a debugger. Each of the two processors can conduct other tests relying on values supplied by the other to detect a debugger. Three or more processors can be used to increase the protection.

In various forms of the invention, orthogonality is further increased by sending timing values from the processors to the Command and Control Center via the fire control and, orthogonally, via the nearby soldier or nearby equipment; these values are taken into account when the Command and Control Center generates software to be downloaded to the missile, and this software, when installed, checks for these values on the execution environment.

If these timing values are incorrect, it means that something is wrong with the execution environment, and an alarm sounds, and the installed software is destroyed.

FIG. 4 provides a variation on the scheme shown in FIG. 3. In the design shown in FIG. 4, various other firmware devices, (ASIC, FPGA, transmitter, oscillator, MMIC, A/D converter, etc.), are enclosed within the tamper-aware and/or tamper-resistant material 20. If an alarm is detected, not only is software within the CPU's and on the disk destroyed, but also memory or internal logic within the firmware devices is obliterated.

Obfuscated Executable (OEXE)

Figure 5:
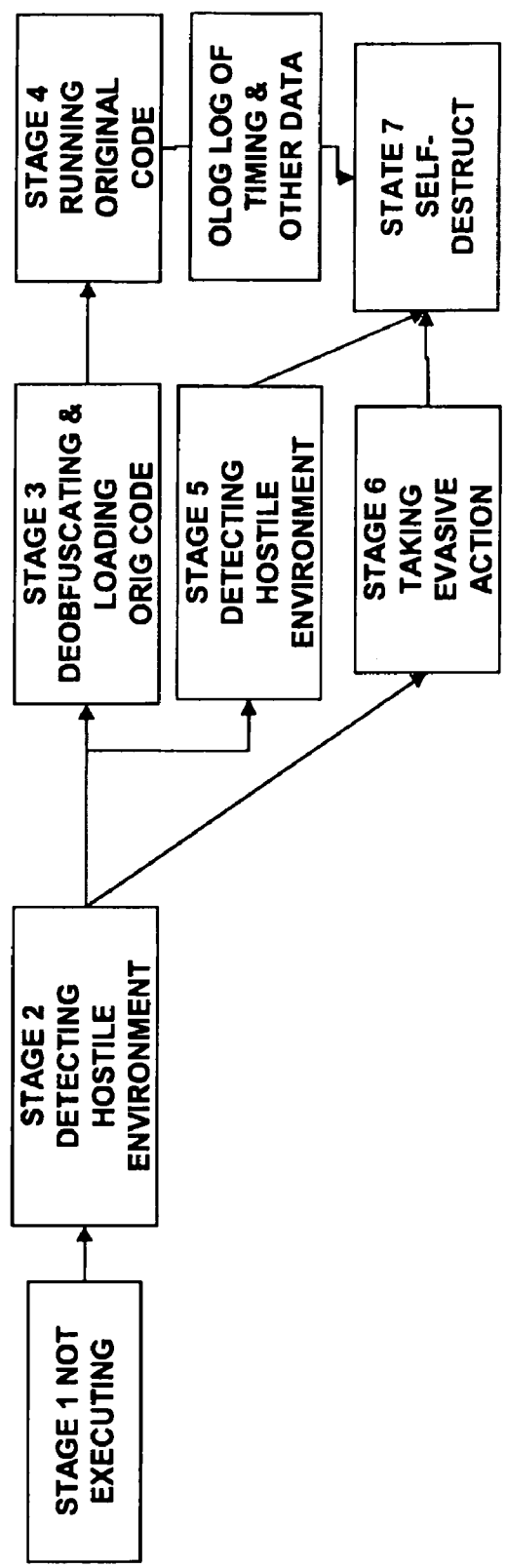
FIG. 5 schematically shows a diagram of states of an OEXE according to one preferred embodiment of the present invention.

As described above, the protected software is encrypted and inserted into another executable program, the obfuscated executable (OEXE). FIG. 5 shows a state diagram of an OEXE.

In State 1, where the OEXE is not running, the protected software, embedded in the OEXE, is completely encrypted. In State 2, the OEXE attempts to detect whether the environment is hostile. If the environment appears hostile, the protected software is not decrypted. If the environment is found to be safe, and the software is needed for the mission, the OEXE decrypts and loads the protected software in State 3 and running the decrypted codes in State 4. In State 5, the OEXE regularly checks if the environment has become hostile, and if a change from safe to hostile is detected, then goes to State 6, in which the OEXE first destroys unencrypted copies of the protected software in memory or in disk, and second destroys the OEXE itself. After State 4, when the mission terminates or should have terminated, the OEXE also destroys protected software in State 7. In State 2, if the OEXE determines that it is being run in a hostile environment, then goes to State 6 in which the OEXE takes evasive actions by cycling through many instructions that are essentially a blind alley, so that the enemy cannot determine how the OEXE detected that the environment was not safe. The OEXE itself preferably is highly resistant to reverse engineering.

The strategies that the OEXE uses to detect the presence of a hostile environment include the following:

1. Encrypt, Run and Decrypt (RAD)

The Encrypt, Run and Decrypt strategy is to obfuscate various files into the OEXE. The OEXE runs on the target environment with root permission, decrypts the files into a secure directory using a key hidden in the OEXE, and runs a predetermined file. This strategy by itself may not be sufficient in some applications, since if an adversary captures the OEXE and runs it in an environment it controls, and the decryption key may eventually be extracted by use of automated debuggers.

RAD is useful for protecting script files in a financial industry environment. In this case, the danger is internal employees changing script files which are stored unencrypted. This strategy protects against persons with limited technical ability, who however still represent a significant threat in the financial industry.

2. Keys Installed On Target (KIOT)

Under this strategy, keys are orthogonally installed on the target site using an "angel" agent. The keys are used by the OEXE to decrypt the protected software, and thereafter destroyed. This limits the vulnerability of the OEXE to the time the keys are actually available on the target site, which might be less than a second.

3. Detect Target Values (DTV)

This strategy involves capturing certain values from the target site with an "angel" agent, and then generating the OEXE so that it searches for these values before running. Good values are those that are hard to duplicate by an adversary. Single values can be used as decryption keys. Timing values from coprocessors running on the target machine would represent values that would be tested for being within a reasonable range, although a "range" is not used as an encryption key. However, information is not stored as to what a reasonable range is within the OEXE, because an adversary might be able to discover this information with a debugger. Preferably, the range is reduced to a single number, and this single number is used as a key.

4. Detect Debugger (DDB)

There are many strategies in the literature to detect the presence of a debugger. Most of these strategies are directed to detecting the presence of a known debugger, and might fail if a different debugger is utilized. In addition to utilizing these strategies, in accordance with one form of the invention, several processors are used inside a single chip, and timing values are used from these processors to detect the presence of a debugger.

5. Run Time Orthogonal Procedure (RTOP)

To provide absolute protection, values that the enemy cannot control are supplied from a remote location and those values are supplied orthogonally so that the enemy cannot discover them when the enemy is in control of the target environment. To the extent feasible, the DARE system preferably utilizes orthogonal values. It is always possible to supply orthogonal values to an execution environment, but under some conditions, it is not feasible to do so due to some type of policy prohibition, such as never attaching a machine to a network, or operating a weapon in a battlefield environment in which participants were not separately in communication with a remote command and control center.

6. Detect Change Of Environment (DCE)

Detect change of environment is a series of strategies to use after the execution environment has been determined to be safe, and after the protected software has been decrypted and is running in the target environment. The OEXE continues to run in the background, checks for alarm conditions, and if an alarm is raised, deletes the unencrypted software that is to be protected and takes other actions. Alarm conditions may include (a) signal supplied by a remote control station; (b) attempted or actual penetration of the outer special material (e.g., tamper aware and/or tamper resistant material); (c) removal of the package from the weapon; (d) end of the mission; (e) unusual environmental changes, such as shock; (f) failure to receive orthogonal values from a remote control or from an execution environment; (g) timing values errors received from or not received from coprocessors; and (h) other conditions that can be added as the design of a specific DARE system progresses.

7. Protect Obfuscated Executable From Reverse Engineering (PORE)

In accordance with this aspect of the invention, a chain is formed, consisting of many links that the OEXE traverses. While traversing this chain, the OEXE develops a cryptographic key. Also while traversing this chain, the OEXE utilizes various values to develop this key. These values might stored in the execution environment or they might be received via wireless from outside the execution environment. If an incorrect value is encountered, the chain traversal of the OEXE stops. An adversary is not able to determine where in the chain something goes wrong.

This chain is automatically generated so that it may be arbitrarily long. Preferably, the chain is generated in randomly determined locations in memory. It may be possible for an adversary to single-step through the chain with an automated debugging tool, however, (a) single-stepping even with an automated debugger would be significantly slower than executing the chain directly; (b) forward breakpoints could not be set; and (c) as mentioned, the adversary would be not able to determine where in the chain something goes wrong.

Preferably the DARE system utilizes values provided orthogonally from a remote location that are used to decrypt values in the protected executable. The PORE chain utilizes orthogonal values, and therefore provides this level of protection. Even if the PORE chain does not utilize such orthogonal values, but rather relied on values already present in the target environment, the PORE chain provides a level of difficulty that makes it computationally infeasible for an enemy to understand the values that are required to decrypt protected portions of the OEXE.

In order to construct a PORE chain, a list of templates is provided for individual links. Each individual template is capable of permutation so that the link it produced is randomly different from other links. While running through the chain, cryptographic keys are developed. These keys contain values obtained from the environment and/or values obtained from outside the environment, and hashes developed from the code of the chain itself. If the chain does not produce proper cryptographic values, it does not continue to run. A defined procedure is established so that the chain knows when it has come to an end.

Random Obfuscating Compiler (ROC)

Figure 6:
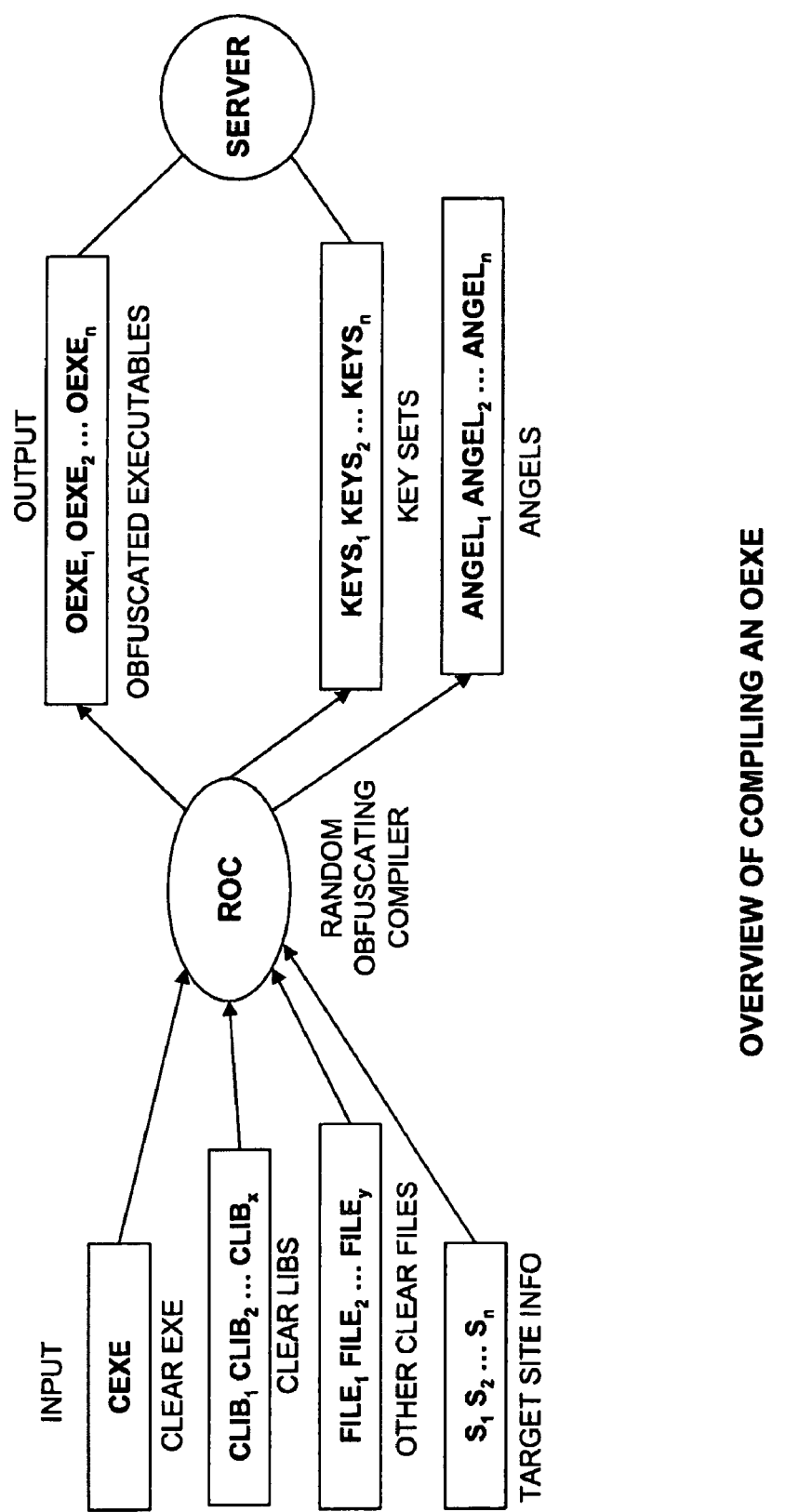
FIG. 6 schematically shows a process of compiling an OEXE according to one preferred embodiment of the present invention.

FIG. 6 shows a process of compiling an OEXE using the Random Obfuscating Compiler (ROC). The inputs to the Random Obfuscating compiler are shown on the left. Executables in the clear (CEXEs), libraries in the clear (CUBS) and other files represent the software that is to be protected from enemy capture and which will eventually run on the target environment. The OEXE also uses inputs that provide unique values that apply to the target site. The OEXE uses these values to verify that it is running on the correct target site. These values are gathered from the target site by an "angel" agent.

The ROC system employs one or more ANGELS, a compiler, and an Obfuscated Executable to achieve the required functionality to protect the clear executable and its subsidiary files from capture by an adversary and subsequent reverse engineering.

An ANGEL is an agent which runs on a target site before installation of the OEXE. The ANGEL acquires information about the target site, namely the state of the system clock, stat values from various files, and a list of the processes that are running on the target site.

The present disclosure provides two embodiments of the ROC system, ROC1 and ROC2. Appendix I including diagrams and descriptions describes the embodiment of ROC1 and Appendix II including diagrams and descriptions describes the embodiment of ROC2. The first diagram in Appendix I is an overview of ROC1, which generally describes ROC1, and the first diagram in Appendix II is an overview which generally describes ROC2.

In the ROC1 embodiment, the acquired information is written to a file, which is transferred to the ROC control environment, and used by the ROC compiler to make the OEXE. This file can be hand carried to the ROC control environment or can be transferred using ssh or automated ssh (ssh and scp using rsa keys with ssh-keygen, ssh-agent and ssh-add).

In ROC1, the compiler examines the file to determine if the test environment appears authentic and without viruses and then generates an OEXE that will only run on the target environment. First, an OEXE stub is prepared. An OEXE stub is an executable with a large void area into which the ROC compiler encrypts and inserts the clear executable and its supporting files, which are collectively referred to as the CEXE. In this embodiment, the compiler encrypts the clear executable and its supporting files and embed them into an OEXE stub so that clear products form a chain, with each link containing the keys to decrypt the following link. The products are added into the OEXE stub in randomly determined locations with randomly determined keys, so that successively compiled OEXEs for the same CEXE and the same target is randomly different.

The key to decrypt the last link in the OEXE, and to find the location of the last link in the OEXE is developed by performing a stat of the files on the target site. Thus the key to begin the process of decrypting the chain is not contained within the OEXE but is manufactured from values found only on the target site. Under this embodiment, the OEXE is delivered to the target site, and only runs on the target site, and decrypts the embedded CEXE by generating a key from values unique to the target site. The OEXE can also examine the state of the system clock, and abort further processing if the state is inconsistent with the values previously returned by the ANGEL. It would be very difficult for an adversary to falsify an environment in which the system clock was consistent with the system clock in the target environment. Under this embodiment, the OEXE does not communicate with the ROC control after delivery to the target site. If the OEXE determines that the target site environment is authentic and safe, the OEXE decrypts the CEXE, runs it in ramfs, and monitors the CEXE while it runs. When the CEXE has ceased running, the OEXE obliterates it. Ramfs is a memory not a disk, so the CEXE can be quickly and completely obliterated when the CEXE ceases to run or when an attack is detected. As for detecting an attack while the CEXE is running, the OEXE has the strategy of detecting events outside the processor, such as end of mission, an explosion, loss of power and so forth, as well as the options of detecting the presence of a worm running on the processor. To detect a worm running on the target site, one strategy is to examine the list of processes that are maintained by the /proc file system in UNIX. Another strategy is to modify the kernel so as to intercept calls made to system modules, with a view of not allowing them to go forward it they appear to be directed at attacking the CEXE.

In the embodiment ROC2, the ANGEL and the OEXE securely communicate with a server using TCP/IP. In this embodiment, the key to begin decrypting the CEXE is generated on the server and retained on the server until the OEXE has provided information about the target site and after the server has analyzed this information and determined that the target site is authentic and does not contain harmful worms. The server securely passes the key to the OEXE running on the target site, and the OEXE decrypts and runs the CEXE. In this embodiment, the OEXE monitors the CEXE while it runs and remains in contact with the server. The ROC2 environment also supports one or more ANGELs running on the target site or sites which also monitors the CEXE while it executes.

In the case where the cluster runs software from a shared disk, an ANGEL is delivered to the shared disk, and the ANGEL application is run from the master node and all internal nodes. The ANGEL running on the master node communicates with an ANGEL server running on Gabriel. The ANGELs running on internal nodes also communicate with the ANGEL server. Their communications are routed through the ANGEL running on the master node. For all communications, the ANGELs generate a public/private key pair, send the public key to the ANGEL server, which generates a session key, encrypts the session key with the public key, and sends it back to the node, and the node and the ANGEL server thus establish a session key between them. This process is repeated periodically, which is called "strobing the keys", or strobed encryption.

Each ANGEL process has a unique set of keys used to communicate with the ANGEL server. The ANGEL server has a master plan of how the nodes should be configured, and using the ANGELs checks that the nodes are authentic. It is also possible to verify the identify of the nodes through orthogonal procedures using telephone lines.

The ROC2 system produces an empty OEXE of sufficient size to hold the protected software, called the CEXE. The ROC compiler encrypts the CEXE software, and inserts it into the OEXE. The OEXE is downloaded by the ANGEL Server through the ANGEL on the master node to the master node, and is run by the ANGEL on the master node.

The OEXE examines the master node to determine if it is on the correct node and that there are no hostile root applications present, and eventually requests keys to decrypt the CEXE from the ANGEL server. The ANGEL server analyzes the information presented by the OEXE, and current information from all of the ANGELs running on the cluster and determines if the target environment is authentic and safe. If the target environment is safe, the ANGEL server provides the keys and orders the OEXE to decrypt and run the CEXE in ramfs, accessible only by root. All of the ANGELs monitor the running of the CEXE, and destroy it when it has run to completion or when they detect an attack.

Figure 7:
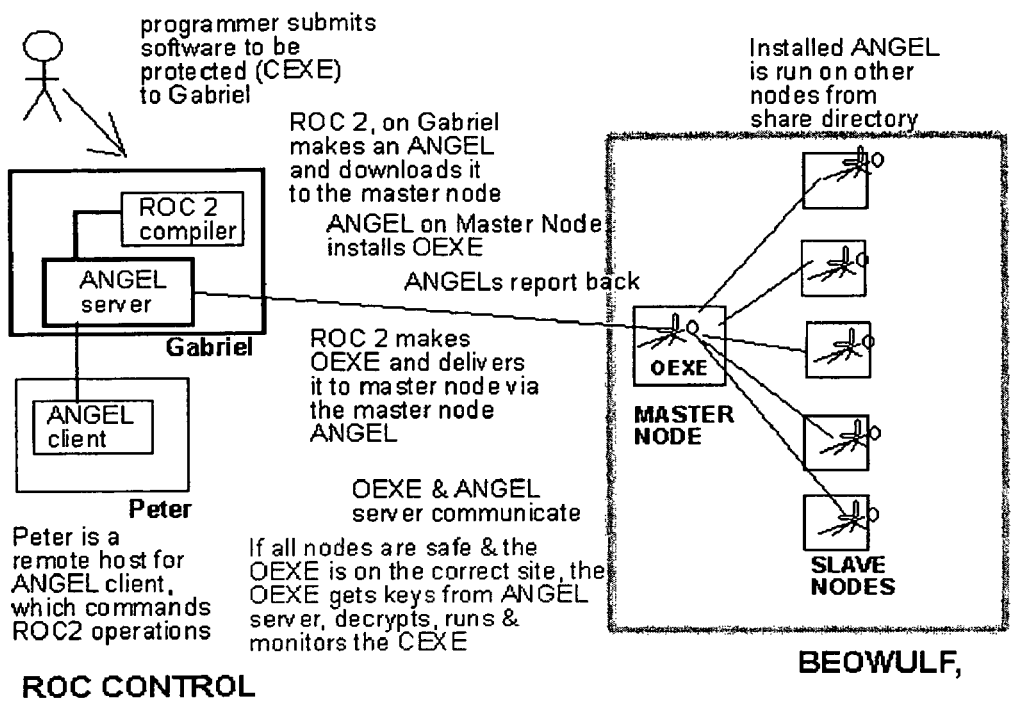
FIG. 7 schematically shows a random obfuscating compiler system according to one preferred embodiment of the present invention.

An exemplary process of protecting a target software using ROC2 is demonstrated in FIG. 7. As shown in FIG. 7, the Random Obfuscating Compiler Version 2 (ROC 2) system to protect the software using the ROC 2 control software runs on a computer (Gabriel) connected to a Beowulf cluster where the protected software will be running. ROC2 can be securely managed and examined from anywhere on the Internet. ROC 2 operating procedures includes: (1) A programmer submits the software (the clear executable or CEXE) to be protected to Gabriel, which runs ROC 2 software. (2) ROC 2 creates an ANGEL which is downloaded to the master Beowulf node. Each node executes this ANGEL from a share directory, and verifies that each ANGEL process is running on its correct target, obtain appropriate values, and securely send these values to the ANGEL server via the ANGEL on the master node. (3) The ANGEL server is a program that runs on Gabriel, and acts as a server to communicate with ANGELs, with the ROC 2 compiler, and with the ANGEL client. The ANGEL client is a program which communicates with the ANGEL server and can be used to control ROC operations. The ANGEL client now runs on Gabriel. However, eventually, the ANGEL client will be able to be run from remote computers. "Peter" is an example of a remote host for an ANGEL client. (4) To accommodate the Beowulf architecture, where the same executable is run from a share directory by numerous processes on different machines, additional types of ANGELs suitable for different computing environments are defined. The standard ANGEL (Type 1, Single Processor) is an agent which can be installed only once in a predefined location and can be run only once from a predefined target. A standard ANGEL is used in ROC1. The parallel ANGEL (Type 2, Multiple Processors) is an ANGEL which is located in a share directory on a cluster, and is executed from the share directory by the various nodes in the cluster. (5) On command of the ANGEL client, operating securely through the ANGEL server, the ROC compiler prepares an appropriate Obfuscated Executable (OEXE) based on the values just gathered by the ANGELS. This OEXE contains an encrypted copy of the CEXE. The ANGEL server delivers this OEXE to the master node via the master node ANGEL. (6) The master node ANGEL runs the OEXE on the master node. The OEXE verifies that it is running on the correct target, and, if the target environment appears safe, attempts to obtain decryption keys from the ANGEL server. (7) The ANGEL server, based on information obtained from ANGELS on the master node and the internal nodes, and from the OEXE itself, decides if the environment is safe, and if so, delivers keys to decrypted the embedded software. (8) The OEXE then decrypts and runs the CEXE on the target in ramfs accessible only by root. (9) The OEXE and the various ANGELS monitor the CEXE as it runs and destroy it when it terminates.

ROC 2 also can be applied to the following scenarios: (1) An adversary with access to the Beowulf site attempts to run the OEXE without permission from Gabriel. Permission in this case means that the ANGEL Server is running, that the ANGEL Server authorizes the OEXE to run if the OEXE is on the correct target, runs with root permission at the correct time, and other conditions are met. The OEXE does not run even on the target site without Gabriel permissions. The OEXE does not run on any other machine. (2) An adversary attempts to reverse engineer the OEXE using the techniques of Christina CiFuentes and others. (See Bibliography for cites to CiFuentes et al.) The adversary cannot obtain an unencrypted copy of the protected software. The adversary cannot force the OEXE to decrypt the protected software. (3) The OEXE is run properly with permissions from Gabriel on the target site and from internal nodes. An adversary without root permission on the master node attempts to obtain a copy of the protected software now running. The adversary cannot see the protected software. (4) The OEXE has been properly run with permissions from Gabriel on the target site and from internal nodes, and the application has now run to completion. An adversary without root permission on the master node attempts to obtain a copy of the protected software previously running. The adversary cannot see the protected software. (5) The OEXE is run properly with permissions from Gabriel on the target site and on the internal nodes. An adversary with root permission on the master node attempts to obtain a copy of the protected software now running. The OEXE discovers that an adversary with root permission is attempting to copy the protected software and intervenes, deletes the protected software and terminates the application.

A description of important software modules used in ROC1 and ROC2 is provided. These modules are referred to in the above description and also in the diagrams in Appendix I and Appendix II.

"sever": This C module implements the Angel Server, which has the functions of communicating with instances of the ANGEL running on various Beowulf nodes, managing the generation of an OEXE, delivery of an OEXE to the Beowulf cluster, and monitoring the running of the OEXE and the CEXE on the Beowulf cluster. The Angel Server runs on a machine referred to as Gabriel. The Angel Server performs the functions shown in the ROC2 top level diagram shown in Appendix II.

"client": This C module, communicates with the Angel Server, is designed to be an interface for an operator to provide commands to the Angel Server and to obtain information about the status of the Beowulf system. The client is shown in Appendix II, and is implemented in software in client2.

"roc": roc is the program for the roc compiler; roc is written mostly in assembler, parses the setup.ini file to obtain information relating the CEXE and supporting files that are to be protected and run on the Beowulf cluster. The roc compiler uses a module make_oexe to insert the CEXE files into an oexe executable. The roc compiler is shown in Appendix I for ROC1 and Appendix II for ROC2.

"oexe": This module is the oexe. In ROC2, it is written so that, given a key and an offset from the Angel Server, it is able to extract, decrypt and run the CEXE embedded within it. (In ROC1, it computes the key from an analysis of various files on the target machine.) The actual embedding of the CEXE in the oexe is done by the roc compiler. The functionality of the oexe is depicted in Appendix I for ROC1 and Appendix II for ROC2. The oexe is first compiled as a stub, with a large blank area. Then the roc compiler encrypts and randomly hides the CEXE components in this area in the form of a chain. When the OEXE runs, if it is given the proper key, it decrypts the chain, load the CEXE components into a memory disk (ramfs) and run the CEXE components and monitor them while they run. The OEXE is written in assembler for ROC1, but in ROC2, the top level module is written in C, with calls to underlying assembler modules. Aside from the mechanisms for obtaining the keys, and the monitoring after the CEXE is run, the ROC1 and ROC2 OEXEs are very similar.

"angel": This module, written in C for ROC2, produces an ANGEL, which is a software executable. The ANGEL visits target sites, conducts secure key exchanges with the Angel Server, and sends encrypted information to the Angel Server about the target sites, performs an orthogonal authentication procedure, and monitors the target site when the CEXE is executing. In ROC1, the ANGEL does not communicate with a server, but rather writes a encrypted file with the information it obtains. Also, in ROC1 the ANGEL is written entirely in assembler, whereas in ROC2 the ANGEL has C components for networking and asymmetric encryption.

"get_info": Assembler module that produces a file of stat info on 8 files which are presently hard coded. Creation time and info numbers are saved. This file also contains information from the machine ID and from the processor clock. Get_info is called by the ANGEL and by the OEXE.

"aproc": C module which continuously samples the /proc file system to find a list of running processes, which are then added to a doubly linked list. As new processes are deleted or added, these are added to the linked list or marked deleted. Creation and deletion times, underlying executable and home directory are also saved in the doubly linked list. This module is the start of a monitoring capability. When run by the ANGEL, a list of approved processes can be developed, and additional processes which might appear during the execution of the CEXE (other than those run by the CEXE) can be prohibited.

"make_key": Makes a unique key from the stat of a particular machine. This key is unique to the machine from which the stat info was obtained unless an adversary could make a complete hard disk copy. However, the processor clock time can be used to distinguish disk copies from original disks. (In ROC2 this key is not used to encrypt the first link in the chain of CEXE values. That key is passed from the Angel Server, so it does not reside in the OEXE). However, make_key is still very useful because it allows the Angel Server to know if the OEXE is on the correct machine.

"make offset": Makes a unique offset into the ANGEL section of the OEXE from a key. The is the starting point in the ANGEL section of the chain of encrypted links of various parts of the CEXE. The chain is described below in make_oexe. In ROC1 the OEXE gets offset from the key made by make_key from the stat module which examines the disk on the target environment.

"make_oexe": This module in the compiler, and its inverse oexe in the OEXE, are the heart of the ROC technology. These modules are written in assembler. make_oexe, used by the ROC compiler, produces an encrypted linked list in the ANGEL section of an OEXE. The chain is made in one direction in the compiler and read in the other direction in the OEXE. When read by the OEXE, each link contains the offset of the next link and the key to compile that link. The offsets are randomly generated by the make_oexe module. The key to encrypt last link made in the compiler (the first link in the OEXE) and the offset of that link in the ANGEL section is not stored in the OEXE, but is maintained by the ROC2 server, which passes the key to the OEXE after the OEXE is running on the target site and after the information provided by the OEXE appears to be correct. This functionality is shown in blocks 9.0 and 11.0 and subsidiary blocks in the ROC2 Flow Diagrams in Appendix II. Some code fragments at the start of the chain will themselves be encrypted. These fragments will be decrypted by the key supplied by the ROC2 server, and will be loaded, and dynamically run by the OEXE. Thus, some of the code run by the OEXE will itself be encrypted with a key which the OEXE does not contain. We have demonstrated in sample ROC1 code that in assembler we can dynamically generate instructions and then run them. Theoretically, we can run these instructions at a location in memory that is dynamically generated when the instructions are created. This technique prevents an adversary from setting a forward break point in code as a method of reverse engineering.

"angel_rsa": This is a C module that interfaces to the rsa reference 2 release of the rsa asymmetric algorithm and the rsa Triple Des Algorithm. angel_rsa can be called from assembler and C based modules. angel_rsa is used by the OEXE, which is written in assembler, to use RSA asymmetric encryption and Triple Des symmetric encryption, which is used to encrypt communications between the OEXE and the ANGEL server.

"angel_sockets": This is a C module that provides networking connectivity using standard TCP/IP sockets routines from Stevens Unix Network Programming, which can be modified as desired. angel_sockets can be called from assembler and C based modules, and it is used by the OEXE and angel to provide network connectivity with the ANGEL server.

The installation procedure installs an OEXE on the target site so that it is certain that the OEXE is installed only on the correct target site, that it can be installed only once, and that it is able to protect itself against capture by an adversary and against being exercised in an environment controlled by an adversary. The following Steps 1 through 4 are exemplary installing process appropriate for the army missile discussed earlier. Steps 1 through 4 take a minimum of time to execute and execution is completely automatic once the network receives the instruction to launch the missile.

Step 1 prepares the weapon for launch. The fire control is in communication with the Command and Control. The Command and Control is also in communication with a nearby soldier, perhaps even the soldier that is giving the order to prepare for launch. Command and Control independently verifies that this solider is alive and has not been captured. FIG. 8 shows the soldier and the weapon communicating with Command and Control.

In Step 2, Command and Control builds an "angel" agent that is designed to acquire certain values from the target site. Some values would be timing values from the various coprocessors running on the target site.

The "angel" agent only runs on the target site. The Command and Control Center generates an asymmetric key and includes the public key with the "angel" agent.

The "angel" agent is sent to the army weapon via the fire control, and confirming orthogonal material is also sent to the weapon via some other path, perhaps another solider known to be nearby the weapon. The delivery of the "angel" agent is shown in FIG. 9.

Step 3 occurs when the "angel" agent executes on the target site. The "angel" agent captures various values found on the site, particularly timing values from the coprocessors. The agent also uses values received from the Command and Control Center via the soldier. The agent randomly generates a symmetric key, encrypts the symmetric key with the public key just generated by the Command and Control Center, encrypts the values with the symmetric key, and returns a package of the encrypted values and the encrypted symmetric key to the Command and Control Center, as shown in FIG. 9.

Step 4. Next, using the private key generated in Step 2, the Command and Control Center decrypts the values provided in the package sent by the "angel" agent. Using these values, the Command and Control Center builds an OEXE or series of OEXEs, that are designed to run on the target and only on the target environment. The Command and Control Center also builds another "angel" agent that installs these OEXEs on the target site.

The organization of the OEXEs are randomly different from one another and from other OEXEs that may previously have been produced for other army weapons.

Step 5. The OEXE is now delivered to the army weapon. Confirming values are also delivered to the army weapon orthogonally via one or more other channels. The OEXE has been constructed to use these values only when it is executed on the army weapon. FIG. 10 shows possible paths for the delivery of the confirming values.

Whether paths A, B or C, or a combination of these paths, is used to deliver confirming cryptographic values is a decision that can be made randomly and automatically by the software at the time of installation, and preferably is made differently for different installations.

The important point is to provide values that an adversary cannot duplicate, so as to assure that the OEXE is exercised only on the target environment and that the target environment is safe, which is to say, at a minimum for an army weapon, that it is in control of the army.

The OEXE running on the army weapon verifies that it is running on the correct target site, verifies the confirming values sent via A, B, and C, and, if everything is proper, decrypts and loads the appropriate classified software for launch and subsequent control. The OEXE also now monitors the environment to detect if the environment is still safe. When an alarm is sounded, the OEXE destroys all decrypted software.

Under conditions that the launch environment remains safe, and the missile is launched, the OEXE continues to monitor the environment throughout the mission. An important point is that classified software is destroyed by the time the mission ends or by the time it should have ended. One principle is to destroy software and firmware that is no longer needed for the mission. A second principle is to destroy software if the missile fails to detonate. A third principle is to assure that upon detonation the software is destroyed. A fourth principle is to assure that these security procedures do not interfere or degrade weapon performance.

If this procedure above described detects that there is something wrong with the battlefield (i.e. the soldiers have been captured, there are no soldiers etc.) then the missile does not load and launch. What level of battlefield integrity is required to launch a missile is a design decision that is made by the army prior to fielding the weapon. This threshold can, however, be configurable.

Although the above paragraphs illustrate the invention primarily with reference to an army missile system, the concept is applicable in other contexts, such as a high performance computing (HPC) environment. In the HPC environment, there are single machines with multiple processors and there are series of networked machines that work on a single problem. In the HPC environment, the problem arises of protecting software that might be duplicated on multiple processors running on the same machine or on multiple machines that are networked together.

For these environments, a chip located inside one of the HPC machines, protects especially sensitive software and provides this software to other processors on an as-needed basis.

The level of integrity required of the execution environment in order to launch a protected software application is a design decision. This threshold level is potentially configurable at time the executable is launched.

While the claimed invention has been described in detail and with reference to specific embodiments thereof, it is apparent to one of ordinary skill in the art that various changes and modifications can be made to the claimed invention without departing from the spirit and scope thereof. Thus, for example those skilled in the art will recognize, or be able to ascertain, using no more than routine experimentation, numerous equivalents to the specific substances and procedures described herein. Such equivalents are considered to be within the scope of this invention, and are covered by the following claims.

Appendices that aid in understanding of the present invention are incorporated within the present specification. Appendix I includes diagrams and illustration for ROC1. Appendix II includes diagrams and illustration for ROC2.

What is claimed is:

1. A method for defending a software against reverse engineering in a target environment comprising:
   a server acquiring information associated with said target environment, said acquired information associated with said target environment comprising one or more temporary values and one or more values acquired from a system unrelated to said target environment;
   wherein the one or more temporary values comprising one or more just in time values supplied close to a time of use of the one or more just in time values;

generating an obfuscated executable program using a random obfuscating compiler by encrypting said software with said acquired information associated with said target environment;

sending said encrypted software with said acquired information associated with said target environment to an execution environment;

acquiring information associated with said execution environment, said acquired information associated with said execution environment comprising one or more orthogonal values utilized to verify said execution environment is a correct execution environment associated with said target environment;

wherein the one or more orthogonal values are monitored scenario information selectable based on a security level associated with the execution environment;

authenticating said execution environment as the target environment by comparing said acquired information associated with said execution environment with said acquired information associated with said target environment; and if said two sets of information match, decrypting said encrypted software with said acquired information associated with said execution environment.

2. The method according to claim 1 further comprising: if said two set of information do not match, destroying said software.

3. The method according to claim 1, wherein said step of encrypting said software with said acquired information associated with said target environment comprises generating an obfuscated executable program to incorporate said software with said acquired information associated with said target environment using a random obfuscating compiler.

4. The method according to claim 1, wherein said step of acquiring information associated with said target environment includes acquiring information associated with said target environment through at least one anonymous electronic link, known only by the target environment.

5. The method according to claim 1, wherein said step of acquiring information associated with said target environment further comprises encrypting said acquired information.

6. The method according to claim 1, wherein said step of decrypting said software comprises decrypting said software using a decryption key which is sent to said target environment from a remote location.

7. The method according to claim 6, wherein said decryption key comprises a value, the value being unique to the target environment.

8. The method according to claim 1, further comprising detecting an attack on said decrypted software.

9. The method according to claim 8, wherein said attack comprises: a worm, a loss of power, an explosion, an end of mission, or any combination thereof.

10. The method according to claim 8, further comprising:
intercepting a call to one or more system modules based on said detection of said attack; and
preventing access by said intercepted call.

11. The method according to claim 8, further comprising:
intercepting a call at a kernel level before execution of said call based on said detection of said attack; and
preventing execution of said intercepted call.

12. The method according to claim 8, wherein said detecting said attack further comprises examining a process list to detect said attack on said decrypted software.

13. The method according to claim 8, further comprising destroying said decrypted software based on said detection of said attack.

14. The method according to claim 8, further comprising storing said detection of said attack.

15. The method according to claim 1, further comprising receiving the one or more orthogonal values from equipment near said execution environment, a person near said execution environment, or any combination thereof.

16. A random obfuscating compiler (ROC) system for defending a software against reverse engineering in a target environment of comprising:
a server for generating one or more anonymous electronic links for acquiring information associated with the target environment, said one or more anonymous electronic links known only by the target environment, said acquired information associate with said target environment comprising one or more temporary values and one or more values acquired from a system unrelated to said target environment,
wherein the one or more temporary values comprising one or more just in time values supplied close to a time of use of the one or more just in time values,
wherein said server comprises a compiler for compiling said software to be protected, wherein said software to be protected is encrypted by said acquired information associated with the target environment to generate an obfuscated executable program,
wherein said obfuscated executable program is adapted to acquire information associated with an execution environment and authenticate said execution environment as said target environment by comparing said acquired information associated with said execution environment with said acquired information associated with said target environment though said one or more anonymous electronic links, said acquired information associated with said execution environment comprising one or more orthogonal values utilized to verify said execution environment is a correct execution environment associated with said target environment
wherein the one or more orthogonal values are monitored scenario information selectable based on a security level associated with the execution environment.

17. The system according to claim 16, wherein said obfuscated executable program is adapted to: monitor said software to be protected; destroy said software based on a software copy detection; destroy said software based on a termination of said software; and/or destroy said software based on an attack detection.

* * * * *